United States Patent [19]
Kobayashi et al.

[11] Patent Number: 5,337,352
[45] Date of Patent: Aug. 9, 1994

[54] PRIVATE BRANCH EXCHANGE SYSTEM HAVING AN AUTOMATIC OPTIMAL ROUTE SELECTING MECHANISM

[75] Inventors: Takayasu Kobayashi, Tokyo; Tsutomu Shimasue, Yokohama, both of Japan

[73] Assignee: Fujitsu Limited, Kawasaki, Japan

[21] Appl. No.: 722,201

[22] Filed: Jun. 27, 1991

[30] Foreign Application Priority Data

Jun. 29, 1990 [JP] Japan .................................. 2-173522

[51] Int. Cl.$^5$ ...................... H04M 7/00; H04M 3/42; H04M 3/00
[52] U.S. Cl. ..................... 379/234; 379/201; 379/221; 379/243
[58] Field of Search ............... 379/112, 115, 126, 216, 379/219, 220, 221, 234, 242, 243, 244, 201

[56] References Cited

U.S. PATENT DOCUMENTS

| | | |
|---|---|---|
| 4,791,665 | 12/1988 | Bogart et al. ............ 379/207 |
| 4,866,763 | 9/1989 | Cooper et al. ............ 379/221 |

FOREIGN PATENT DOCUMENTS

| | | | |
|---|---|---|---|
| 230293 | 10/1987 | Japan | 379/233 |
| 239757 | 10/1987 | Japan | 379/233 |
| 94754 | 4/1990 | Japan | 379/221 |

*Primary Examiner*—James L. Dwyer
*Assistant Examiner*—Harry S. Hong
*Attorney, Agent, or Firm*—Staas & Halsey

[57] ABSTRACT

A private branch exchange system includes a switch accommodating a plurality of tenants, each having a plurality of terminals, and a plurality of trunks coupled to the switch. The trunks are coupled to communication lines, and a plurality of routes coupling the private branch exchange system to a zone are formed via the communication lines. A memory stores, for each of the tenants, information indicating routes which can be used. A controller discriminates a tenant sending a call received via the switch and selects an optimal route from among the routes which can be used for a discriminated tenant by referring to the information stored in the memory, so that the call received is sent out to a corresponding one of the trunks which is connected to the optimal route.

12 Claims, 18 Drawing Sheets

|  | TRUNK#1 | TRUNK#2 | TRUNK#3 | TRUNK#4 | TRUNK#5 |
|---|---|---|---|---|---|
| TENANT A | / | / | / |  |  |
| TENANT B |  | / | / |  | / |
| TENANT C | / | / | / | / |  |

COST EXPENSIVE ⇐――――――― CHEAP
QUALITY GOOD ⇐――――――― POOR

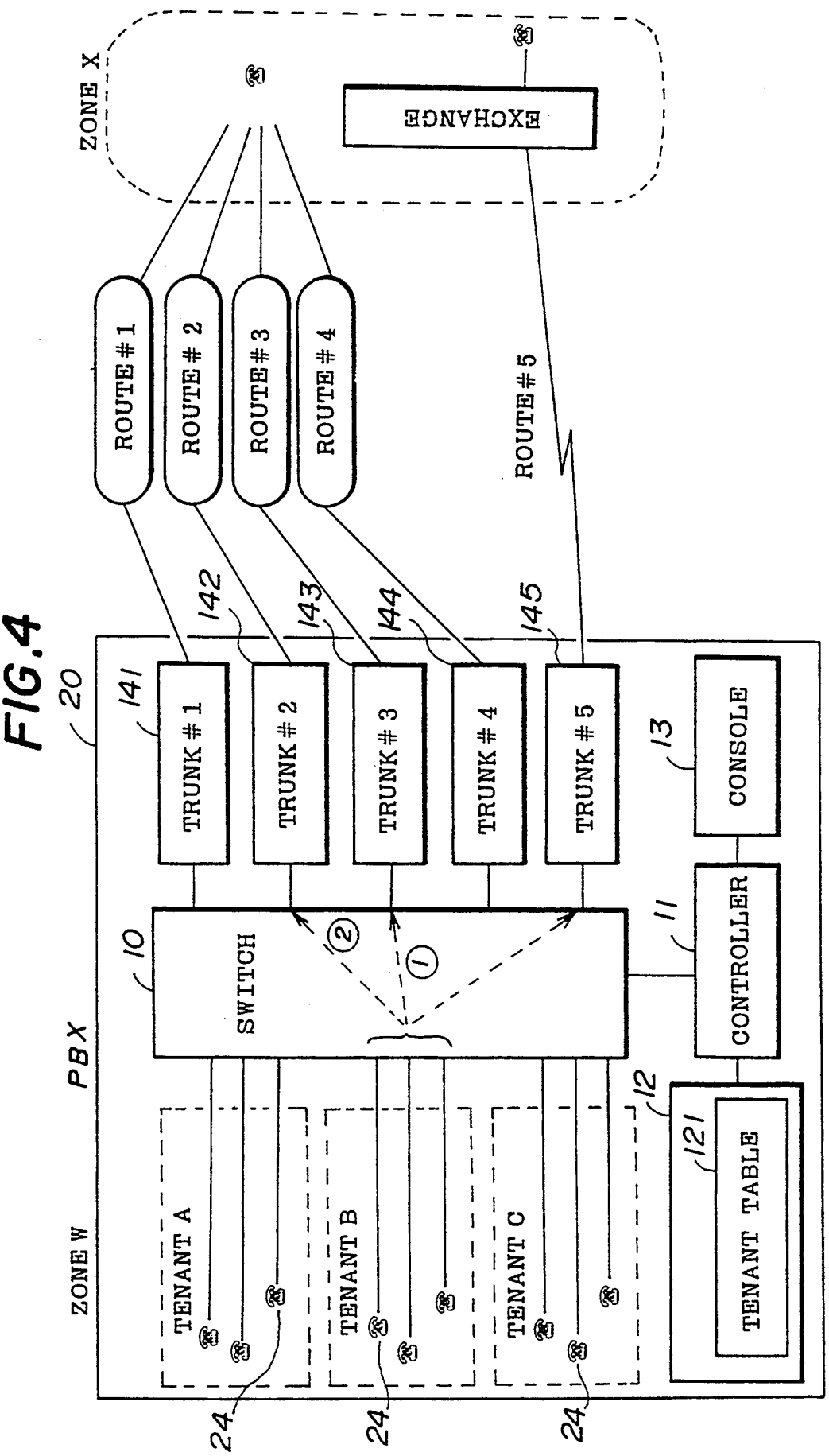

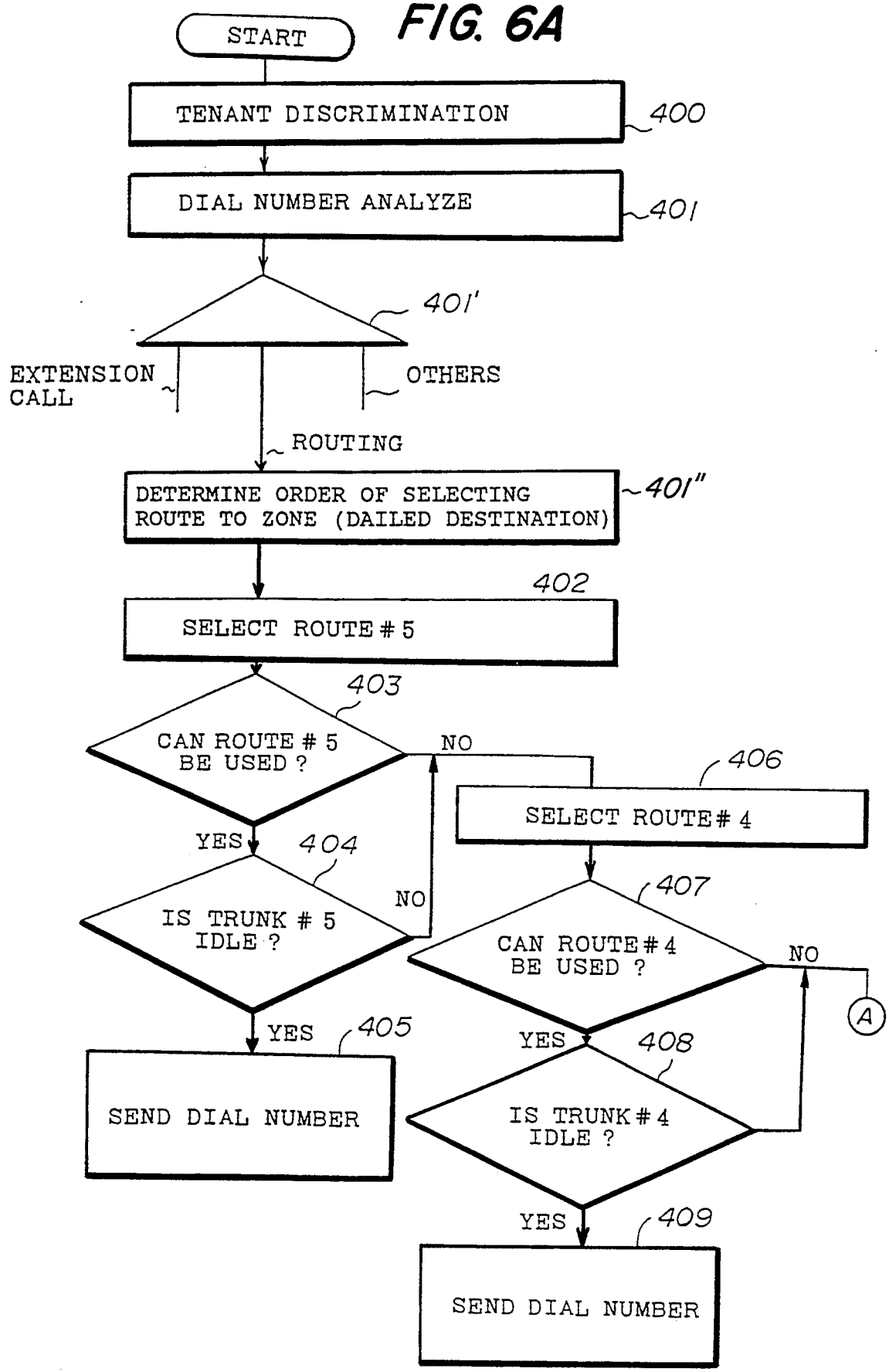

FIG.8A

|  | ROUTE #1 | ROUTE #2 | ROUTE #3 | ROUTE #4 | ROUTE #5 |
|---|---|---|---|---|---|
| TENANT A | 1 | 1 | 1 | 0 | 0 |
| TENANT B | 0 | 1 | 1 | 0 | 1 |
| TENANT C | 1 | 1 | 1 | 1 | 0 |

FIG. 8B

| ITEM NUMBER | RECEIVED DIAL NUMBER<br>A B C D E F G H I J K | DIAL NUMBER LENGTH<br>S     L | LCR TABLE # |
|---|---|---|---|
| 1 | 0 0 6 1 2 3 4 5 6 X | J     J | 1 |
| 2 | 0 0 6 | F     J | 2 |

| LCR TABLE # | POSITION | ROUTE | PATTERN |
|---|---|---|---|
| 1 | 1<br>2<br>3 | R5<br>R3<br>R2 | 5<br>3<br>2 |
| 2 | 1<br>2<br>3<br>4 | R4<br>R3<br>R2<br>R1 | 4<br>3<br>2<br>0 |

| PATTERN | DIAL NUMBER SENT OUT |
|---|---|
| 0 | B C D E F G H I J |
| 1 | - |
| 2 | 0 0 6 6 B C D E F G H I J |
| 3 | 0 0 7 7 B C D E F G H I J |
| 4 | 0 0 8 8 B C D E F G H I J |
| 5 | 7 9 3 5 J |

|  | TIME ZONE #1 | TIME ZONE #2 | TIME ZONE #3 | TIME ZONE #4 | TIME ZONE #5 | TIME ZONE #6 | ... |
|---|---|---|---|---|---|---|---|
| TENANT A | 3 | 1 | 3 | | | | |
| TENANT B | 3 | 1 | 3 | 4 | 2 | 4 | |
| TENANT C | | | | | | | |
| ... | | | | | | | |

|  | WEEKDAY | SATURDAY | SUNDAY | HOLIDAY |
|---|---|---|---|---|
| TIME ZONE #1 | 00:00-09:00 | | | |
| TIME ZONE #2 | 09:00-17:00 | | | |
| TIME ZONE #3 | 17:00-24:00 | | | |
| TIME ZONE #4 | 00:00-07:00 | | | |
| TIME ZONE #5 | 07:00-19:00 | | | |
| TIME ZONE #6 | 19:00-24:00 | | | |
| ... | | | | |

| LCR TABLE # | POSITION | ROUTE | PATTERN | TIME ZONE#1 | TIME ZONE#2 | TIME ZONE#3 | ... |
|---|---|---|---|---|---|---|---|
| 1 | 1 | R5 | 5 | 1 | 1 | 1 | |
|   | 2 | R3 | 3 | 1 | 1 | 1 | |
|   | 3 | R2 | 2 | 1 | 1 | 1 | |
| 2 | 1 | R4 | 4 | 1 | 1 | 1 | |
|   | 2 | R3 | 3 | 1 | 1 | 1 | |
|   | 3 | R2 | 2 | 1 | 1 | 1 | |
|   | 4 | R1 | 0 | 1 | 1 | 1 | |
| 3 | 1 | R2 | 2 | 1 | 1 | 1 | |
|   | 2 | R4 | 4 | 1 | 1 | 1 | |
|   | 3 | R3 | 3 | 1 | 1 | 1 | |
|   | 4 | R1 | 0 | 1 | 1 | 1 | |
| 4 | 1 | R3 | 3 | 1 | 1 | 1 | |
|   | 2 | R4 | 4 | 1 | 1 | 1 | |
|   | 3 | R2 | 2 | 1 | 1 | 1 | |
|   | 4 | R1 | 0 | 1 | 1 | 1 | |
| 5 | 1 | R2 | 2 | 1 | 1 | 1 | |
|   | 2 | R3 | 3 | 1 | 1 | 1 | |
|   | 3 | R4 | 4 | 1 | 1 | 1 | |
|   | 4 | R1 | 0 | 1 | 1 | 1 | |

130

1: ACTIVE
0: INACTIVE

FIG. 12A

| ITEM NO. | RECEIVED DIAL # ABCDEFGHIJKL.. | DIAL # LENGTH S L | LCR TABLE # |
|---|---|---|---|
| 1 | 006123456X | J J | 1 |
| 2 | 006 | F J | 2 |

| ITEM NO. | RECEIVED DIAL # ABCDEFGHIJKL.. | DIAL # LENGTH S L | LCR TABLE # |
|---|---|---|---|
| 1 | 006 | F J | 3 |

| ITEM NO. | RECEIVED DIAL # ABCDEFGHIJKL.. | DIAL # LENGTH S L | LCR TABLE # |
|---|---|---|---|
| 1 | 006123456X | J J | 1 |
| 2 | 006 | F J | 4 |

| ITEM NO. | RECEIVED DIAL # ABCDEFGHIJKL.. | DIAL # LENGTH S L | LCR TABLE # |
|---|---|---|---|
| 1 | 006 | F J | 5 |

129

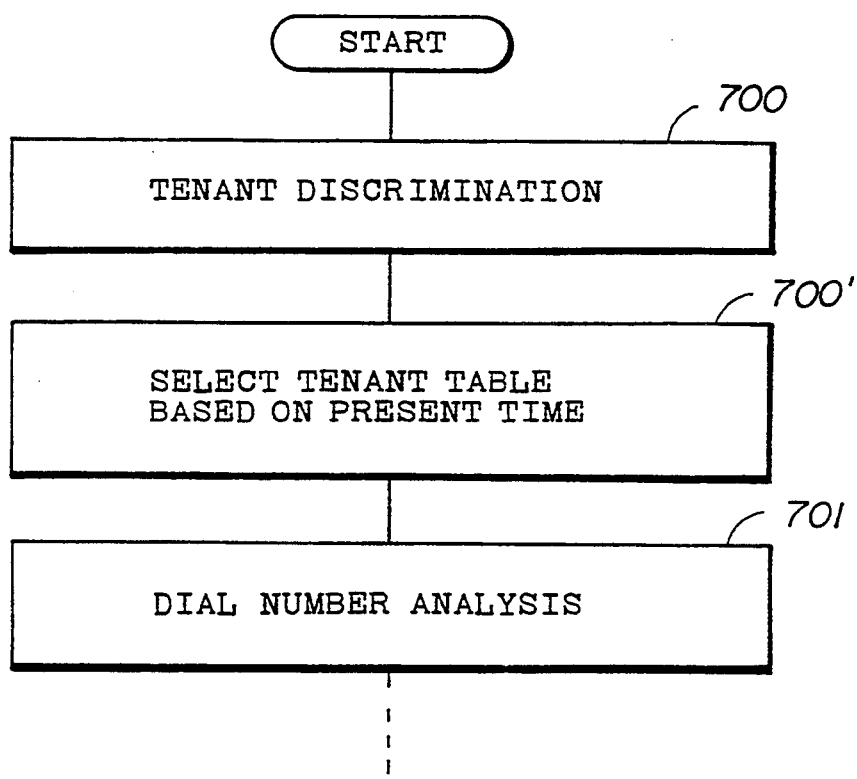

PRIVATE BRANCH EXCHANGE SYSTEM HAVING AN AUTOMATIC OPTIMAL ROUTE SELECTING MECHANISM

BACKGROUND OF THE INVENTION (1) Field of the Invention

The present invention generally relates to a private branch exchange system capable of automatically selecting an optimal communication route coupled thereto.

(2) Description of the Related Art

Recently, a private branch exchange has been practically used which accommodates a plurality of independent tenants and which controls the switching of lines as if the tenants have respective exchanges. Meanwhile, a plurality of communication companies which provide respective communication lines (routes) and equipment have been established. Normally, charges for communications using different communication companies are different from each other. A recent private branch exchange can selectively use a plurality of communication routes. Thus, it is necessary to determine which route should be used each time a call from each tenant is received.

FIG. 1A is a block diagram of a related private branch exchange. A private branch exchange (PBX) has a switch SW to which a plurality of tenants A, B and C are connected. Each of the tenants A, B and C has a plurality of terminals, such as telephone sets. Each terminal is assigned an extension number. The terminals can communicate with each other through the switch under the control of a controller CONT and a memory MEM. Plural trunks, which are coupled to the switch, are provided for each of the tenants A, B and C. The trunks are coupled to communication lines (i.e., routes) such as public telephone lines, in turn coupled to an exchange installed in an exchange office. Normally, the communication lines can be provided by a plurality of communication companies. It is required that the private branch exchange has a function of selecting one of the communication lines in a predetermined way. For example, a least-cost routing method is known.

In order to implement the least-cost routing method, it is necessary to identify which tenant generates a call and which route (communication line) is the least cost route to communicate with a called subscriber in a zone X via, for example, a toll switch. After the least-cost route is identified, a dial number for sending out the received call to the identified route is generated.

In the configuration shown in FIG. 1A, the trunks related to the tenant A are connected to transmission lines (route #1–route #m) provided by a plurality of communication companies. Similarly, the trunks related to the tenant B and the trunks related to the tenant C are respectively connected to transmission lines provided by a plurality of communication companies. The controller CONT selects the least-cost route in response to a call from, for example, the tenant A, and selects a trunk related to the least-cost route. When the selected trunk is busy, the controller CONT selects the second least-cost route and selects a trunk related thereto. During the above-mentioned operation, the controller CONT can recognize the zone or area in which the called subscriber is located from the numerals dialed, and compares the recognized zone with information stored in the memory MEM. By this comparison procedure, the controller CONT can select the least-cost route (optimal route) connected to the recognized zone. Then, the controller CONT generates a dial number in conformity with a network of the identified least-cost route.

In Japan, a special number which discriminates each of plural communication companies from each other is added to the head (i.e., beginning digit positions) of the telephone number. The controller CONT sends to the identified least-cost communication line such a special number and then the dial or dialed number specifying the called party. This will now be described in more detail with reference to FIG. 2.

It is now assumed that a call generated in a zone having a toll number "03" terminates at a subscriber in a zone having a toll number "06" and that four routes provided by four different communication companies are available to connect the toll number "03" zone to the toll number "06" zone. Route #1 directly connects the "03" zone to the "06" zone, while routes #2 –#4 connect the "03" zone to the "06" zone via route #1. Upon receiving the call from the zone "03", the controller CONT recognizes, from the received call, which zone is addressed. Then, the controller CONT determines the optimal route (least-cost route) by referring to a table stored in the memory MEM. If the optimal route is route #1, the controller CONT sends a network of the route #1 the telephone number received from the calling tenant without adding any special number. On the other hand, if the route #2 is determined as the optimal route, the controller CONT adds a company identification number '00aa' to the head of the telephone number received from the calling tenant, and then sends out to the route #1 the telephone number with the company identification number added thereto. The company identification number such as '00aa' is added to the dialed number when a particular trunk is captured and the call outgoes (i.e., is transmitted) via the captured trunk. The route #2 is coupled to the route #1 at an exchange office having, for example, a toll exchange. The toll exchange recognizes the received company identification number and sends out to a network of the route $\pi 2$ the received telephone number with the company identification number added to the head thereof. Similarly, company identification numbers '00bb' and '00cc' are provided for the routes #3 and #4, respectively.

The configuration shown in FIG. 1A has a disadvantage in that it is necessary to provide, for each of the tenants A, B and C, trunks coupled to different routes or networks provided by a plurality of communication companies.

FIG. 1B shows another related PBX configuration intended to overcome the above-mentioned disadvantage. In FIG. 1B, plural trunks are provided in common to the tenants A, B and C. The trunks are connected to networks provided by different communication companies. When the private branch exchange receives a call from one of the tenants A, B and C, the controller CONT determines the optimal route via the trunks. For example, the controller CONT selects the least-cost route coupled to the destination zone by referring to a table formed in the memory MEM and provided for each zone. If the selected least-cost route is busy, the controller CONT tries to select the second least-cost route.

The table formed in the memory MEM shown in FIG. 1A or FIG. 1B is used in common to the tenants A, B and C. For example, the same least-cost route is always selected in common to the tenants A, B and C. However, in actuality, the needs of the tenants A, B and C may be different from each other. For example, the tenant A needs to use only less-expensive routes, and does not want to be connected to the called subscriber if the less-expensive routes are busy. The tenant B needs to use only expensive routes which have good communication qualities, and does not want to be connected to the called subscriber via less-expensive routes. The configuration shown in FIG. 1A or FIG. 1B does not satisfy such requirements dependent on the tenants.

SUMMARY OF THE INVENTION

It is a general object of the present invention to provide an improved private branch exchange system for selecting an optimal communication route coupled thereto, in which the above-mentioned disadvantages are eliminated.

A more specific object of the present invention is to provide a private branch exchange system capable of automatically selecting an optimal communication route on the basis of conditions dependent on the respective tenants coupled to the private branch exchange.

The above-mentioned objects of the present invention are achieved by a private branch exchange system which comprises a switch accommodating a plurality of tenants, each having a plurality of terminals; a plurality of trunks coupled to the switch, the trunks being coupled to communication lines, a plurality of routes coupling the private branch exchange system to a zone being formed via the communication lines; memory means for storing, for each of the tenants, information indicating routes which can be used; and control means coupled to the switch and the memory means, for discriminating a tenant sending a call received via the switch and for selecting an optimal route from among the routes which can be used for a discriminated tenant by referring to the information stored in the memory means, so that the call received is sent out to a corresponding one of the trunks which is connected to the optimal route.

BRIEF DESCRIPTION OF THE DRAWINGS

Other objects, features and advantages of the present invention will become apparent from the following detailed description when read in conjunction with the accompanying drawings, in which:

FIG. 4 is a block diagram of the private branch exchange shown in FIG.3A in more detail;

FIGS.6A and 6B are flowcharts showing the operation of the private branch exchange shown in FIG.4;

FIG.8A is a diagram showing a tenant table stored in a memory shown in FIG.7;

FIG.8B is a diagram showing an LCR code table stored in the memory shown in FIG.7;

FIG.8C is a diagram showing LCR table stored in the memory shown in FIG.7;

FIG.8D is a diagram showing a dial manipulation table stored in the memory shown in FIG.7;

FIG.11A is a diagram of a time-based LCR code table selecting table stored in a memory shown in FIG.10;

FIG.11B is a diagram of a time zone table stored in the memory shown in FIG.10;

FIG.12 is a diagram of an LCR table stored in the memory shown in FIG.10;

FIG.12A through 12D are diagrams of LCR code tables stored in the memory shown in FIG.10; and FIG.13 is a flowchart showing an essential step of the third embodiment of the present invention.

DESCRIPTION OF THE PREFERRED EMBODIMENTS

Figure 3A:
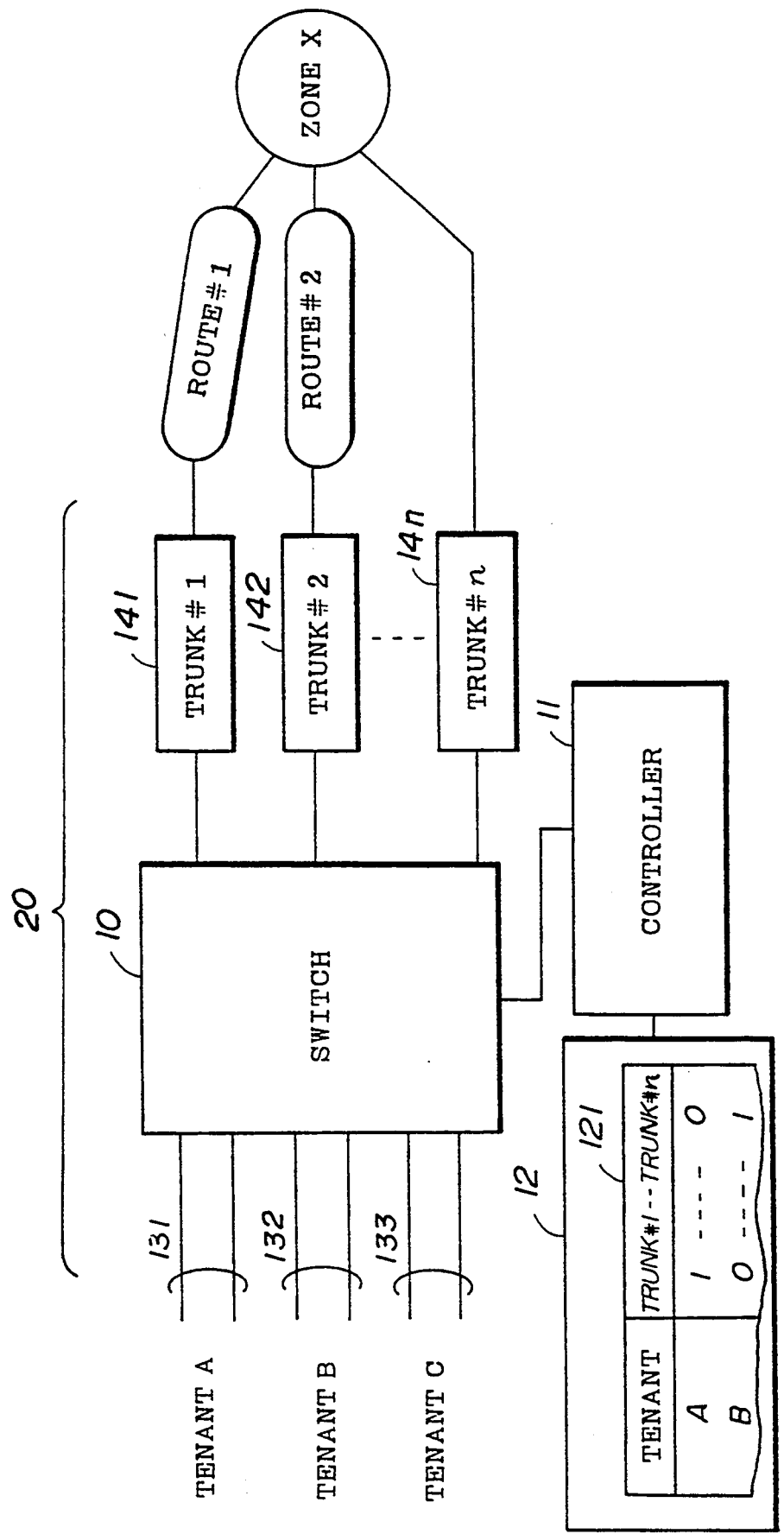
FIG. 3A is a block diagram showing an overview of a private branch exchange according to a first preferred embodiment of the present invention.

FIG.3A is a diagram showing an overview of a private branch exchange 20 according to a first preferred embodiment of the present invention. The private branch exchange 20 shown in FIG.3A includes a switch 10 of a private branch exchange, a controller 11, a memory 12, tenant cables (extension lines) 131, 132 and 133, and trunks (or a trunk group) 141, 142, ..., 14n. The tenant cables 131, 132 and 133 are connected to tenants A, B and C, respectively. The trunks 141, 142, ... are connected to routes (networks) provided by different communication companies. The trunk 14n is connected to a leased communication line. The controller 11 controls the entire operation of the private branch exchange. The memory 12 stores a tenant table 121 for each zone. In FIG.3A, zone X is illustrated. The tenant table 121 registers routes (which correspond to trunks) respectively desired by the tenants A, B and C. The registered routes are assigned a priority dependent on the respective tenants A, B, and C.

A subscriber of, for example, tenant A, dials the telephone number of a called subscriber in the zone X. The dialed telephone number is analyzed by the controller 11 via the switch 10. Then, the controller 11 recognizes the zone to which the call should be sent. The controller 11 refers to the tenant table 121 stored in the memory 12, and recognizes the optimal route (which has the highest priority) which connects the tenant A to the zone X. If the recognized optimal route is busy, the controller 11 refers to the tenant table 121, and recognizes the second optimal route. If the second optimal route is idle, the controller 11 controls the switch 10 so that the telephone set of the tenant A generating the call is coupled to the trunk corresponding to the second optimal route. After the least-cost route is identified, a dialed number for sending out the received call to the identified route is generated.

It should be noted that information on as to which route should be selected, for each tenants is registered in the tenant table 121 for each of the tenants A, B and C.

Thus, with the above-mentioned arrangement, it is possible to satisfy the respective requirements of the tenants A, B and C.

Figure 3B:
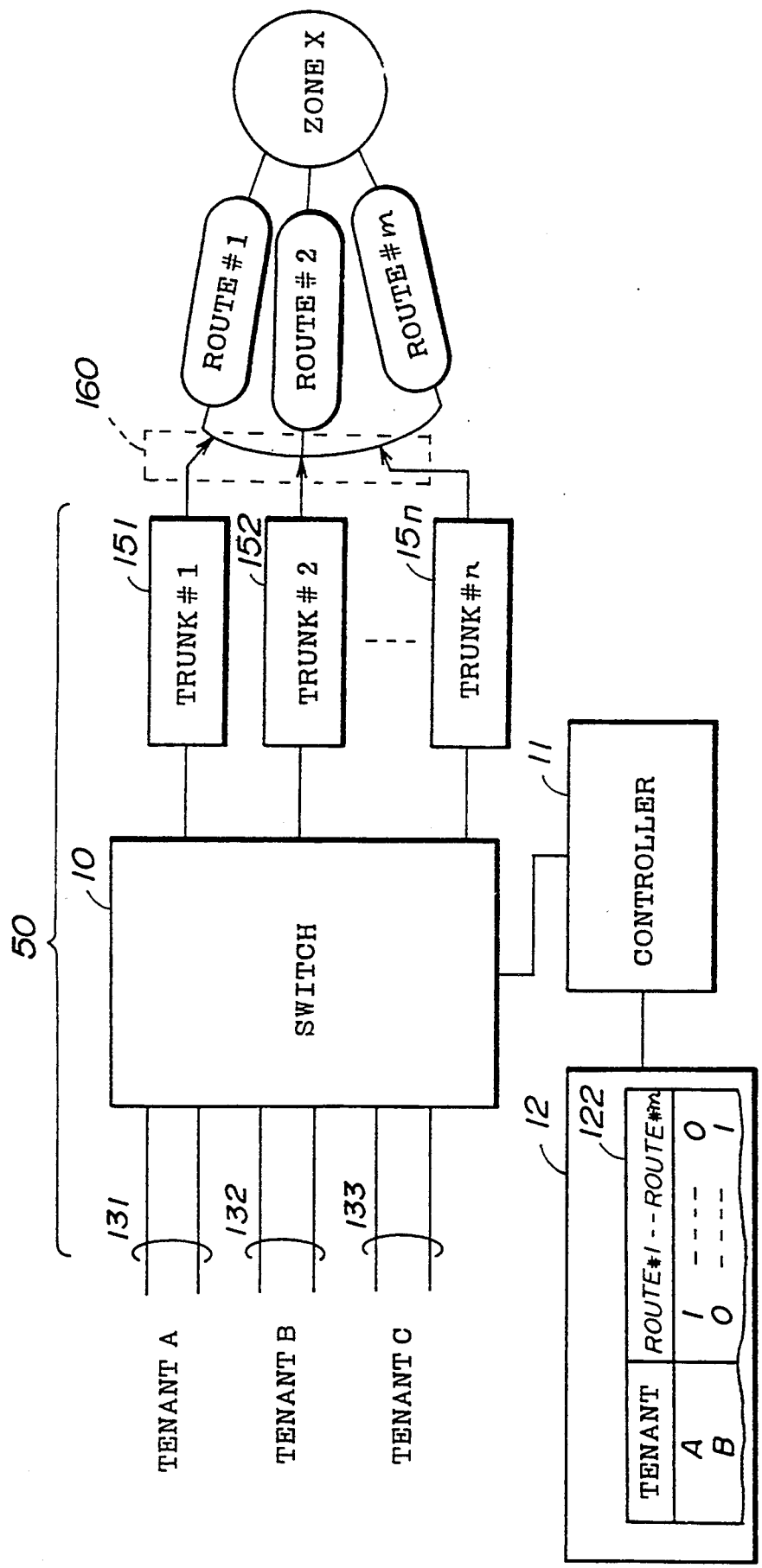
FIG. 3B is a block diagram showing an overview of a private branch exchange according to a second preferred embodiment of the present invention.

FIG.3B is a block diagram of an overview of a private branch exchange 50 according to a second preferred embodiment of the present invention. In FIG.3B, those parts which are the same as those shown in FIG.3A have the same reference numerals. Trunks 151, 152, ..., 15n, which are connected to the switch 10, are substituted for the trunks 141, 142 ..., 14n shown in FIG.3A. The trunk 15n is connected to a leased communication line. The lines extending from the trunks 151, 152, ..., other than the trunk 15n, are selectively coupled, in a toll exchange 160, to routes #1, #2 ..., #m provided by different communication companies. The memory 12 stores a tenant table 122, which is provided for each zone and which registers respective routes desired by the tenants A, B and C.

Upon receiving the dialed number of a destination subscriber from, for example, the tenant A, the controller 11 recognizes which zone should be addressed from the received dial number, and refers to the tenant table 122 registered in the memory 12. Then, the controller 11 selects the optimal route. After that, the controller 11 selects an idle trunk from among the trunks 151, 152 ... other than the trunk 15n, and sends out the received dial number with a company (route) identification number added to the head thereof or a modified dial number. The toll exchange 160 receives the dial number with the company identification number added from the trunk, and sends it out to the route indicated by the company identification number.

It should be noted that information as to which route should be selected, for each tenant, is registered in the tenant table 122 for each of the tenants A, B and C. Thus, with the above-mentioned arrangement, it is possible to satisfy the respective requirements of the tenants A, B and C. In the configuration shown in FIG.3B, if the leased line is selected by the controller 11, the dial number is sent out to the trunk 15n without adding any company identification number. If the trunk 15n is busy and the route which should be next selected is registered in the tenant table 122, the controller 11 sends out the received dial number with the corresponding company identification number added thereto.

A description will be given of the first preferred embodiment of the present invention in more detail with reference to FIGS.4, 5 and 6, in which those parts which the same as those shown in FIG.3A are have the same reference numerals. The private branch exchange 20, which is located in zone W, has four trunks (or trunk groups) 141–144 respectively related to routes #1–#4 provided by the different communication companies, and a trunk 145 coupled to a leased communication line (route #5). The routes #1–#4 extend to zone X, and the route #5 is directly connected to a telephone set related to, for example, tenant B via an exchange at a branch office of the tenant B in the zone X. Further, the private branch exchange 20 has a maintenance console 13, which inputs necessary information and data to the controller 11. The contents of the tenant table 121 can be registered and revised by the maintenance console 13. Each of the tenants A, B and C has a plurality of telephone sets 24.

Figure 1A:
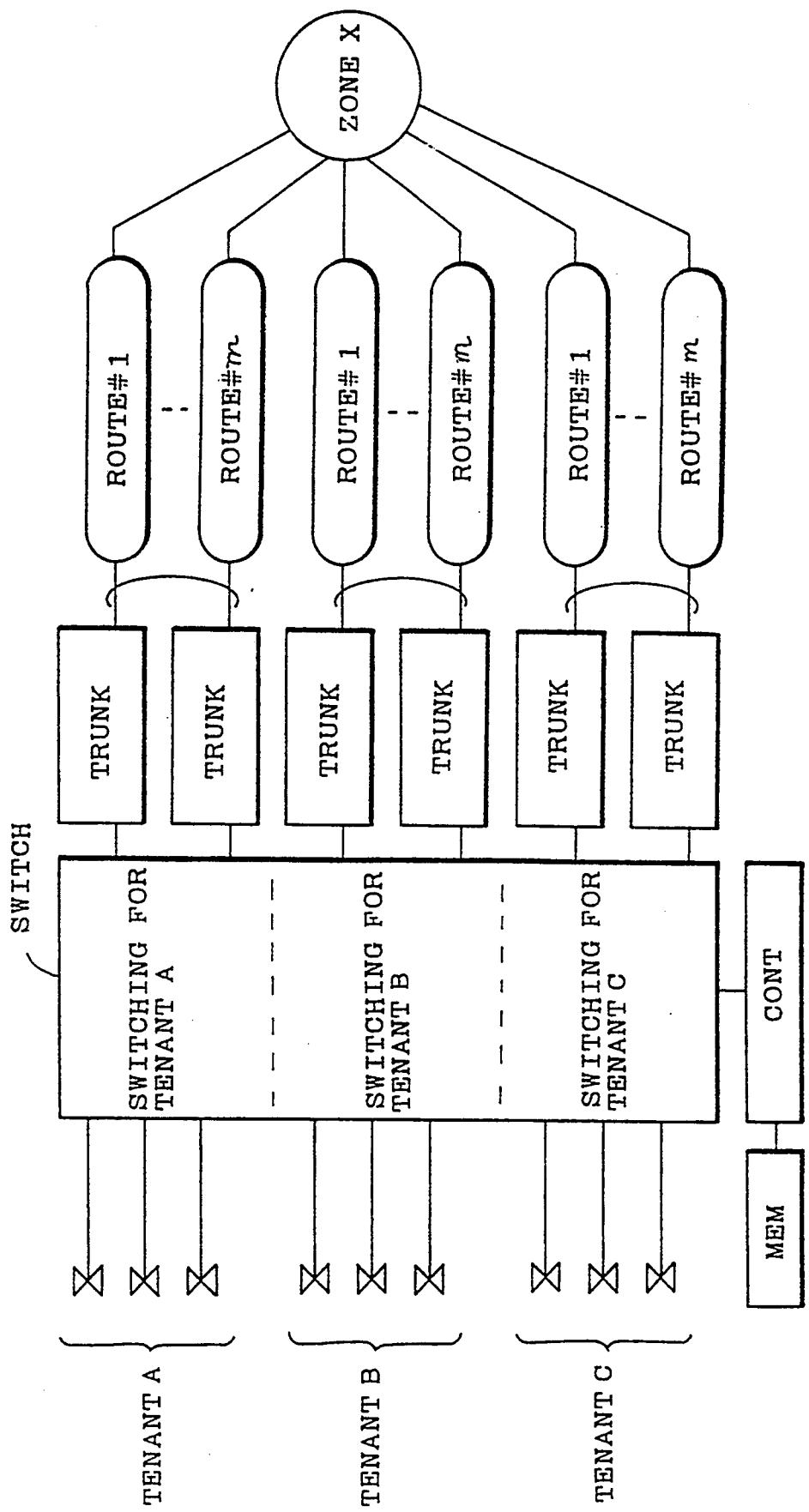
FIG. 1A is a block diagram of a related private branch exchange.
Figure 1B:
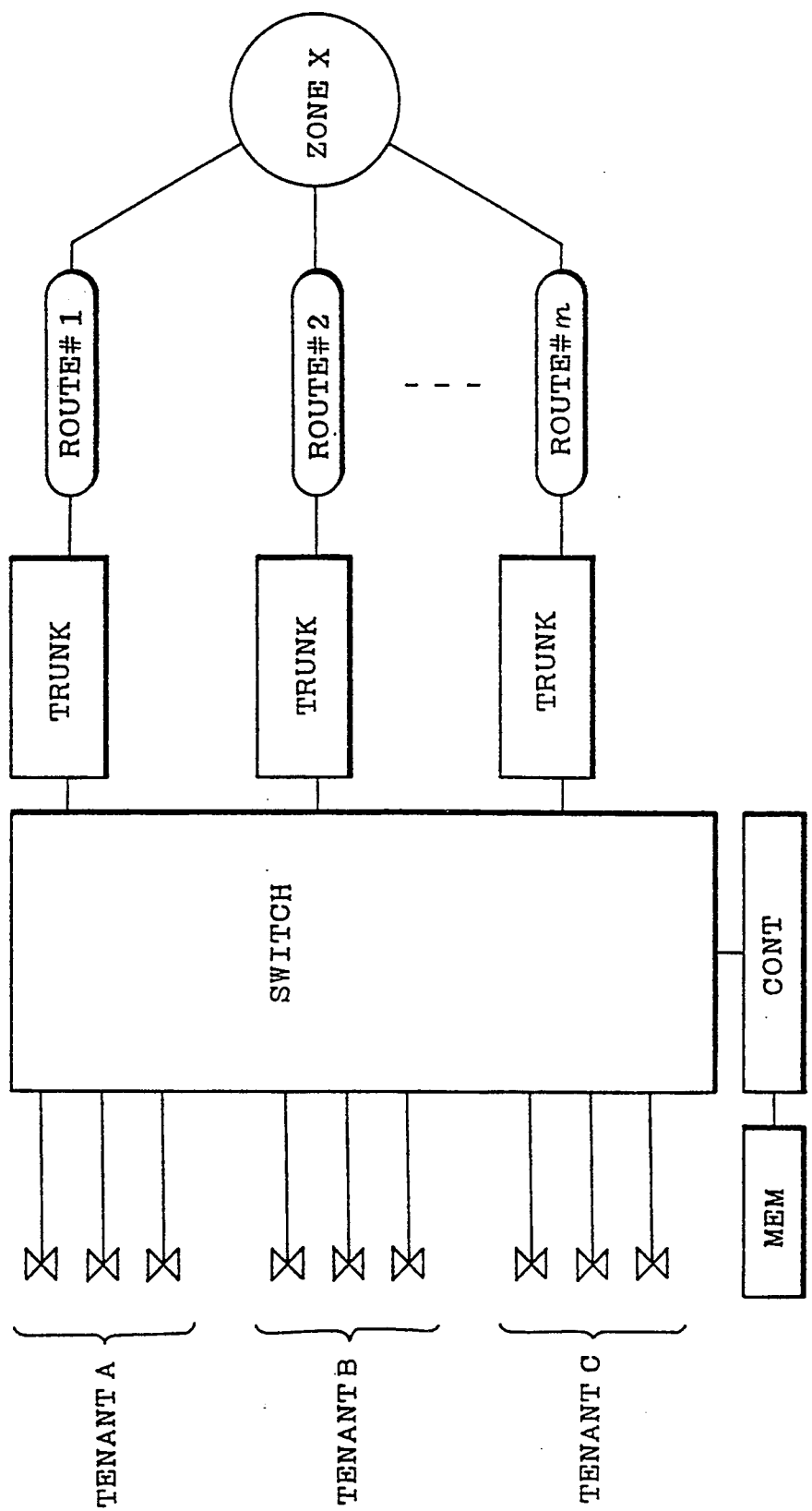
FIG. 1B is a block diagram of another related private branch exchange.
Figures 2, 5:
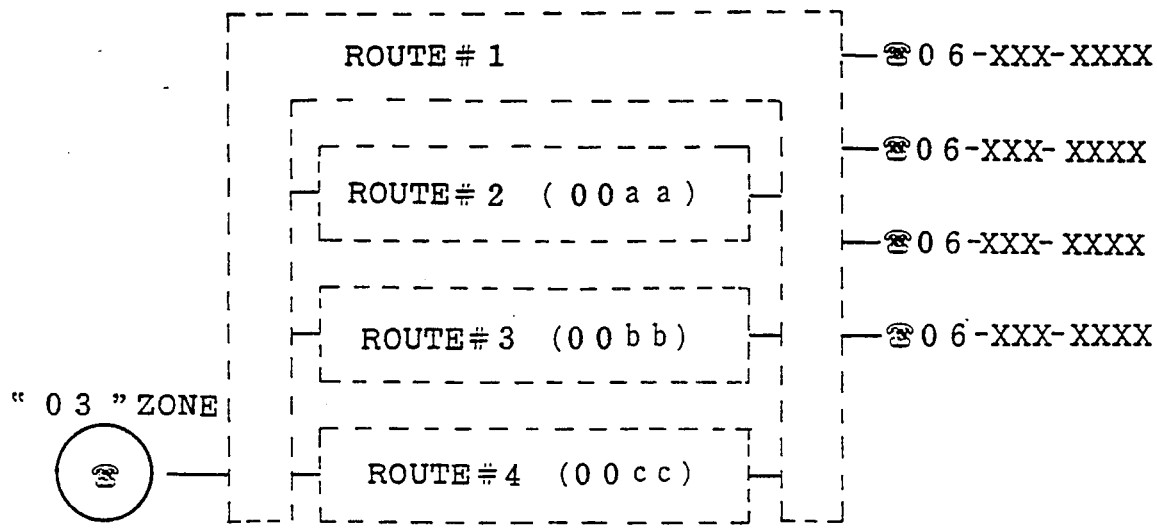
FIG. 2 is a diagram showing an optimal route selecting procedure.
FIG.5 is a diagram showing a tenant table stored in a memory shown in FIG.4.

FIG.5 shows the contents of the tenant table 121 registered in the memory 12 shown in FIG.4. The tenant table 121 registers information on which trunk (i.e., each trunk corresponds to the respective route) should be used for each of the tenants A, B and C. Such information is indicated by "1". For example, the tenant table 121 shows that the tenant A can use the trunks #1, #2 and #3. This means that the tenant A wishes to use high-quality routes and does not wish to use low-quality routes. The tenant B can use the trunks #2, #3 and #5. This means that the tenant B takes into account not only the communication quality but also the communication cost. As has been described previously, the priority for selecting one of the trunks #1–#5 is determined. Regarding the trunks #1–#5, as the number of trunk increases, the priority increases. That is, the trunk #5 has the highest priority. The trunk #4 has a priority higher than that of each of the trunks #1–#3. The trunk #1 has the least priority. The trunk #5 is connected to the leased line, which means that the leased line has the highest priority. The trunk #4 provides the highest-cost route among the trunks #1–#4, and has the best communication quality among the trunks #1–#4. It will be noted that, normally, the communication quality is inversely related contrary to the communication cost. Of course, there is a case where such a relationship does not exist.

Figure 6B:
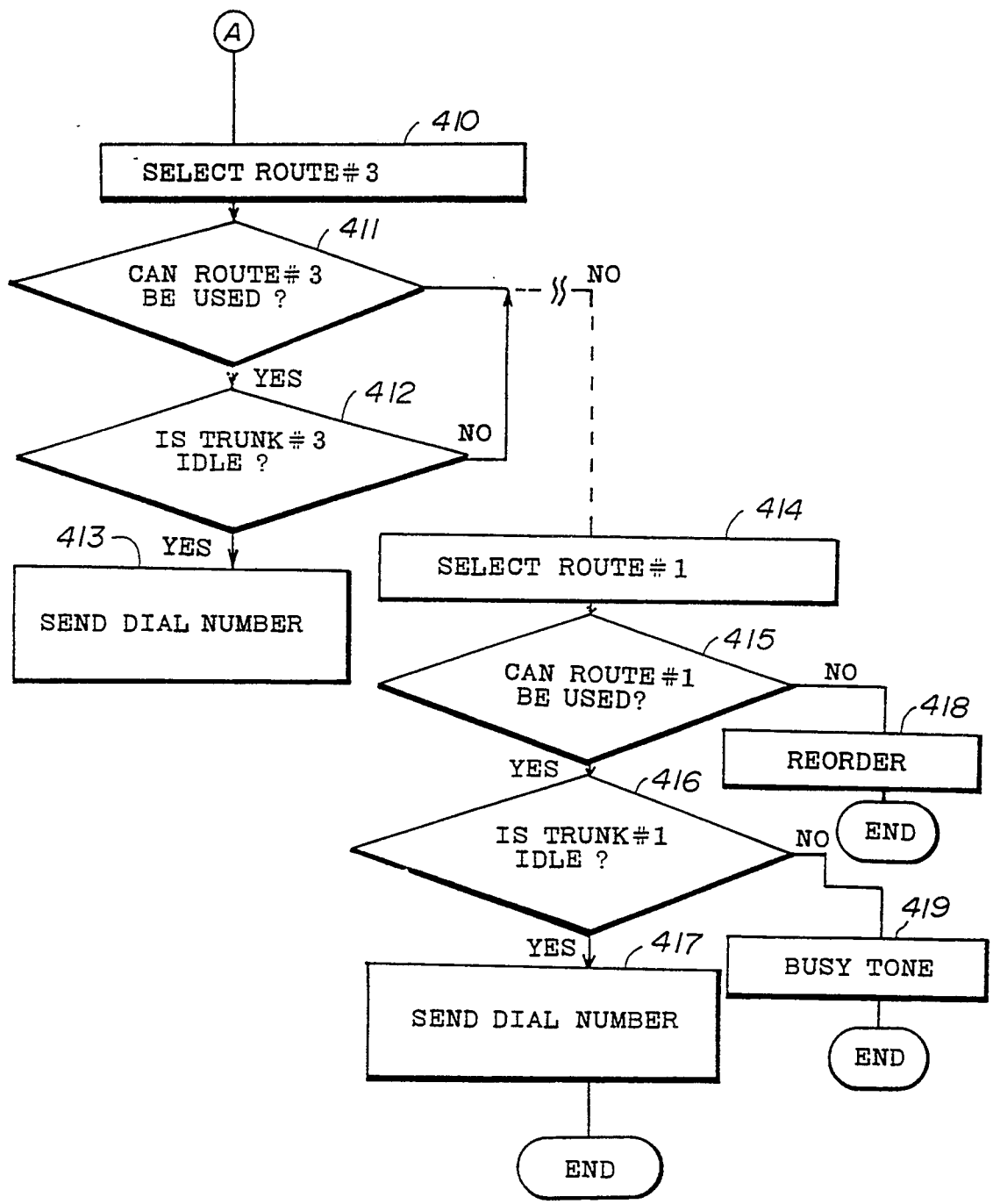

A description will now be given of the operation of the private branch exchange 20 shown in FIG.4, with reference to FIGS.6A and 6B. At step 400, the controller 11 receives a call from a tenant, and determines which tenant sent the received call, in a conventional way by detecting a loop circuit formed by the off-hook condition. A tenant number is assigned with a telephone when the telephone is installed in an exchange. At step 401, the controller 11 receives a dial number from the sender and analyzes the received dial number. At step 401', the controller 11 determines which procedure should be carried out for the received call on the basis of the analyzed results. There are three procedures. The first procedure is to terminate the received call at a telephone accommodated in the private branch exchange 20. The second procedure is an automatic optimal route selecting procedure encompassing steps 402–419. The third procedure processes the received call without the automatic optimal route selecting procedure.

At step 401", the controller 11 determines the order of selecting the route to the required zone (zone X is being considered) in order to identify the optimal route. For example, as shown in FIGS.6A and 6B, the routes #5, #4, ..., #1 are selected one by one in this order. At step 402, the controller 11 automatically selects the route #5, which is connected to the leased line. At subsequent step 403, the controller 11 refers to the tenant table 121, and determines whether or not the route #5 can be used. As shown in FIG.5, only the tenant B requires to use the trunk #5. Thus, when the subscriber generating the call belongs to the tenant B, the result obtained at step 403 is YES. In other cases, the result at step 403 is NO. At step 404, the controller 11 determines whether or not the trunk #5 related to the route #5 is idle. When the result obtained at step 404 is YES, at step 405 the controller 11 sends to the trunk #5 the received dial number or its modified dial number, if necessary in a conventional way. On the other hand, when it is determined, at step 404, that the trunk #5 is busy, step 406 is executed.

When it is determined, at step 403, that it is not allowed to use the route #5, the controller 11 selects the route #4 at step 406, and determines whether or not the route #4 can be used by referring to the tenant table 121 at step 407. When it is determined, at step 407, that the route #4 can be used, the controller 11 determines whether or not the trunk #4 related to the route #4 is idle at step 408. When the result at step 408 is YES, at step 408 the controller 11 sends the received dial number or its modification to the trunk #4 On the other hand when it is determined, at step 407, that the route #4 cannot be used or when it is determined, at step 408, that the trunk #4 is busy, step 410 shown in FIG.6B is performed. At step 410, the route #3 is selected, and steps 411, 412 and 413 are executed in the same way as described above.

In this way, the routes #5–#1 are respectively selected in this order. When the route #1 is selected at step 414 and it is determined that the route #1 cannot be used at step 415, at step 418 the controller 11 returns a reorder tone to the calling subscriber via the switch 10 by using a reorder tone trunk (not shown for the sake of simplicity). The reorder tone indicates that the call is not activated. Even when the result at step 415 is YES, if it is determined, at step 416, that the trunk #1 related to the route #1 is busy, at step 419 the controller 11 sends a busy tone to the calling subscriber by using a busy tone trunk (not shown for the sake of simplicity).

A description will now be given of a private branch exchange according to a second preferred embodiment of the present invention with reference to FIG.7, which corresponds to FIG.3B. The private branch exchange 50 shown in FIG.7 includes the switch 10, the controller 11, the memory 12, the maintenance console 13, the trunk (trunk #1) 151 and trunk 155 (trunk #5). Although in actuality, a plurality of trunks #1 in common to the tenants A, B and C are accommodated in the private branch exchange 50, only one trunk #1 is illustrated for the sake of simplicity. The trunk #5 is connected to a leased line (route #5) specifically used by the tenant B. A plurality of trunks #5 may be provided.

The trunk #1 is used in common to the tenants A, B and C by dialing, for example, "0". The trunk #1 is directly connected to route #1, which extends to the zone X from zone W. Routes #2, #3 and #4 are coupled to the route #1 through the trunk #1. Toll exchanges, which couple the route #1 to the routes #2–#4, are located at positions indicated by arrows TEO. In order to use the routes #2–#4, the respective route (company) identification numbers are added to the head of the dial number by the controller 11, as will be described later. The trunk #5 can be accessed by dialing a trunk access code ("92", for example) ahead of a far-end extension number by the tenant B. It is also possible to access the trunk #5 when the controller 11 detects, for example, a public telephone number identifying a public network via which a subscriber is connected to the leased line extending from the trunk #5.

Figure 7:
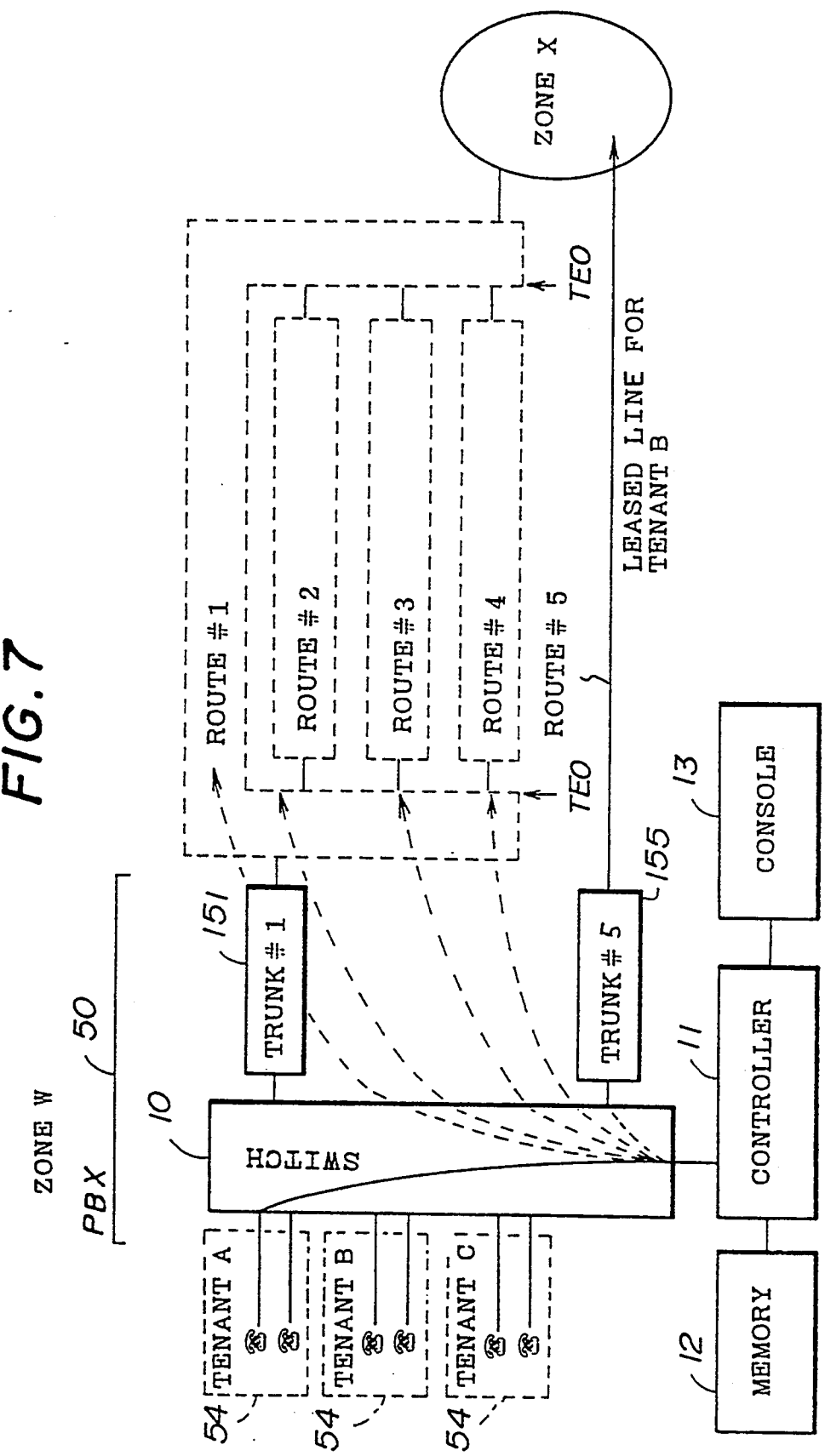
FIG.7 is a block diagram of the private branch exchange shown in FIG.3B in more detail.

FIG.8A shows the tenant table 122 stored in the memory 12 shown in FIG.7 and defined for each zone. It should be noted that the routes are not related to the trunks in the second embodiment, while the routes are related to the trunks in the first embodiment.

FIG.8B shows a code table 123 for selecting an appropriate table number related to zone X ('06') on the basis of the received dialed number. Hereafter, the code table 123 is referred to as an LCR code table 123. The LCR code table is stored in the memory 12 shown in FIG.7. FIG.8C shows an optimal route selecting table (hereafter simply referred to as an LCR table) 123' which is stored in the memory 12 shown in FIG.7 and which is provided for zone X indicated by '06' (trunk access code '0' is omitted). FIG.8D shows a dial manipulation table stored in the memory 12 shown in FIG.7.

Referring to FIG.8B, an item number indicates the order of analyzing received dial numbers. In FIG. 8B, two dial numbers indicated by item numbers '1' and '2' are illustrated. The item number '1' is used for each call to zone X from the tenant B which can use the leased line. In other cases, the item number '2' is used. The received dial number area can store numerals from digit A to digit K and identifies which numerals of the dial number should be analyzed for each of the item numbers '1' and '2'. The controller 11 analyzes the numerals between the digit A and the digit J with respect to the item number '1', and analyzes the numerals between the digit A and the digit C with respect to the item number '2'. A dial number length area stores, for each of the item numbers '1' and '2', information S indicating the last digit of the shortest dial number length and information L indicating the last digit of the longest dial number length. The last digit of the shortest dial number length of the dial number related to the item number '1' is 'J', and the last digit of the longest dial number length thereof is also 'J'. The last digit of the shortest dial number length of the dial number related to the item number '2' is 'F', and the last digit of the longest dial number length thereof is 'J'.

The LCR code table 123 shown in FIG.8B has an area for storing an LCR table number for each item number. The LCR table number '1' is assigned to the item number '1', and the LCR table number '2' is assigned to the item number '2'. Upon receiving a call addressed to zone X, the controller 11 compares the received dialed number with the received dial number defined in the table 123 in the order of item number '1' and '2'. When both the numbers are the same, the corresponding LCR table is selected.

The CLR table 123' shown in FIG.8C stores, for each LCR table number, information about the position, route and pattern of the dial manipulation. When the LCR table number '1' is selected, the controller selects the routes #5 (which is depicted as R5 in the table 123'), #3 (R3) and #2 (R2) one by one and in this order. For each of the routes, the dial manipulation pattern is defined, as shown in FIG.8D. The controller 11 sends out the number in accordance with the selected dial manipulation number. For example, when the route #5 is selected, and the dial manipulation pattern is '7935J'. If the route #5 is idle, '7935J' is sent out to the trunk #5. On the other hand, if the route #5 is busy, the route #3 is selected, and the dial manipulation pattern '3' is used. If the route #3 is idle, '0077BCDEFGHIJ' is sent out to the trunk #1. A number '77' at the third and fourth digits indicates the route #3 (in other words, the communication company providing the route #3). If the route #3 is busy, the route #2 is selected and the dial manipulation pattern '2' is used.

A description will now be given of the operation of the second embodiment of the present invention with reference to FIGS.9A and 9B. The following description demonstrates a case in which the item number '2' (thus, LCR table number '2') is used. A procedure for selecting the route #5 is omitted from the automatic optimal route selecting procedure shown in FIGS.9A and 9B. At step 700, the controller 11 discriminates the tenant which generates a call. In the case being considered, one of the tenants A, B and C is identified. At subsequent step 701, the controller 11 analyzes the received dial number, and determines, at step 701' and based on the received dial number, whether or not the automatic optimal route selecting procedure should be carried out. For example, if the received dialed number is an extension number, the automatic optical route selecting procedure is not executed. At the same time, the controller 11 recognizes, from the received dial number, that the zone at which the call should terminate is zone X, indicated by '006'. When the result at step 701' is YES, at step 701' the controller 11 refers to the corresponding LCR code table 123 and selects the LCR table number corresponding to the item number of the received dialed number. As has been indicated previously, the case being considered uses the item number '2'. By referring to the LCR table 123' shown in FIG.8C, the controller 11 recognizes that the route #4 should be selected as the first route at step 702.

At step 703, the controller 11 refers to the tenant table 122 and determines whether or not the route #4 can be used. When the call comes from either the tenant A or B, the result obtained at step 703 is NO. On the other hand, when the call comes from the tenant C, the result at step 703 is YES. When the result at step 703 is YES, the controller 11 executes step 704, at which step it is determined whether or not an idle trunk is available. When the result at step 704 is YES, at step 705 the controller 1 refers to the table 124 shown in FIG.8C, and modifies the received dial number according to the corresponding pattern '4'. At step 706, the controller 11 sends out a modified dial number in conformity with the pattern '5' to the trunk #1 via the switch 10.

On the other hand, when the result obtained at step 703 or 704 is NO, the controller 11 executes step 707, at which step the route #3 is selected as the second route by referring to the LCR table 123'. Then, steps 708–711 are carried out in the same way as described above. When the route #3 is used, the received dial number is modified according to the pattern '3' shown in FIG. 8C On the other hand, when the route #3 cannot be used, the controller 11 executes step 712 (FIG.9B), at which step the route #2 is selected. Then, steps 713–716 are carried out in the same way as described above. Steps 717–723 are executed in the same way as the aforementioned steps 414–419 shown in FIG. 6

Figure 10:
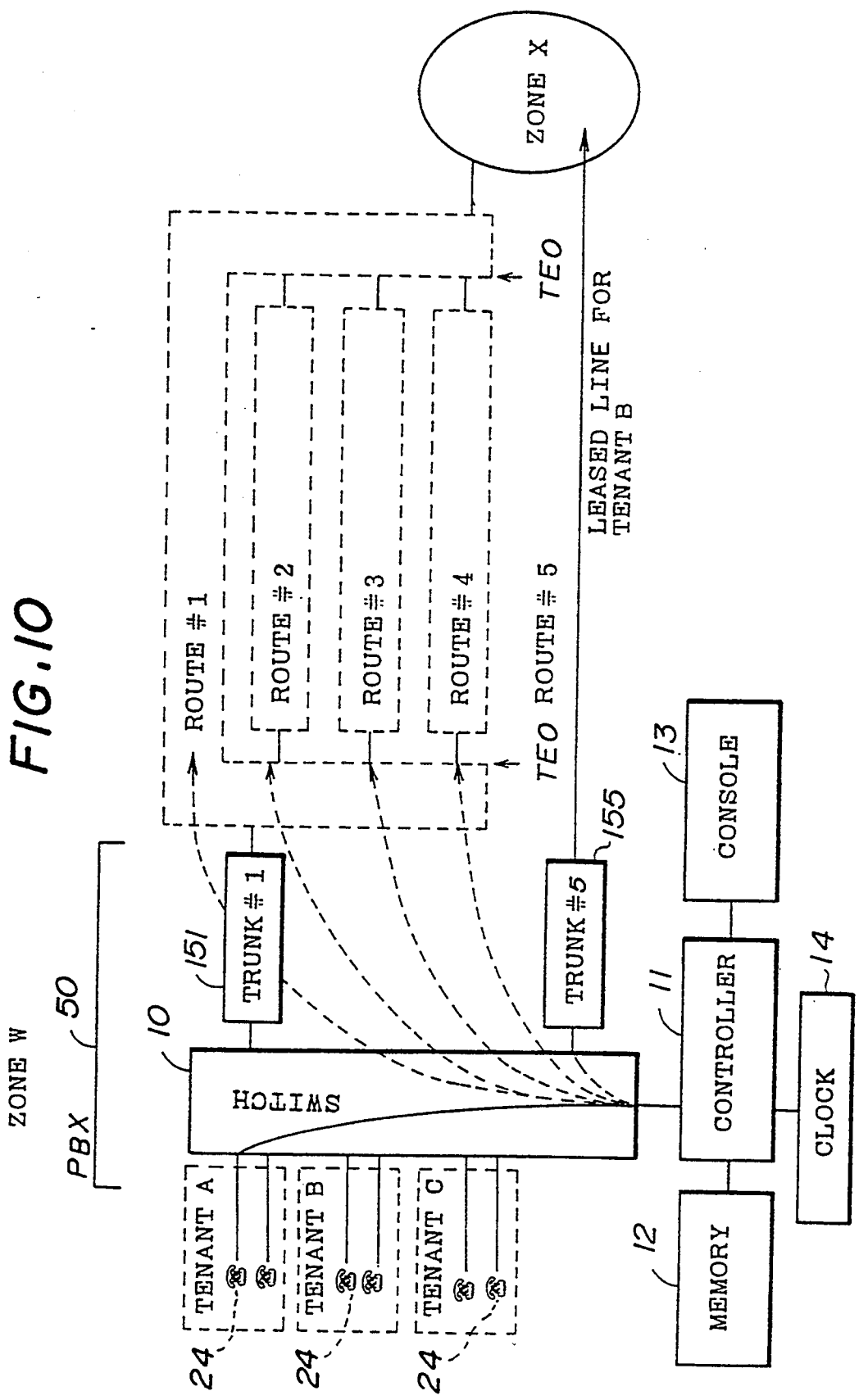
FIG.10 is a block diagram of a private branch exchange according to a third preferred embodiment of the present invention.

A description will now be given of a third embodiment of the present invention with reference to FIG.10, in which those parts which are the same as those shown in FIG.7 have the same reference numerals. The private branch exchange 50 has a clock 14 connected to the controller 11. The clock 14 indicates the present time and has a calendar.

The memory 12 stores, for each zone (zone X in the case being considered), the aforementioned tenant table 122 shown in FIG.8A, a time-based LCR code table selecting table 125a shown in FIG.11A, a time zone table 125b shown in FIG.11B, an LCR table 130 shown in FIG.12, and four route selecting order tables (LCR tables) 126, 127, 128 and 129, respectively shown in FIGS.12A, 12B, 12C and 12D.

The controller 11 selects one time zone from among a plurality of time zones #1, #2 . . . by referring to the table 125B shown in FIG.11B. In the table 125b, only time zones related to weekdays are shown, but other days such as Saturday, Sunday and a holiday can be defined in the same way. For example, when today is a weekday and the present time is 08:00, time zone #1 is selected. The controller 11 determines the tenant which generates the received call, and refers to the table 125a after the time zone is identified. For example, when the discriminated tenant is tenant A and time zone #1 is selected, the controller 11 recognizes that the LCR code table 128 shown in FIG.12C identified by the LCR code table pattern '4' should be used by referring to the tale 125a shown in FIG.11A. Each of the LCR code tables 126–129 respectively shown in FIGS.12A–12D is configured in the same way as the LCR code table 123 shown in FIG.8B.

The controller 11 identifies the item number related to the received call in the selected LCR code table, and selects the corresponding LCR table defined therein. For example, when the controller 11 recognizes the item number '1', it selects the LCR table '1' in the table 130 shown in FIG.12. Then, the controller 11 selects one route in accordance with the order defined in the LCR table '1', and selects the optimal route in the aforementioned way.

Figure 9A:
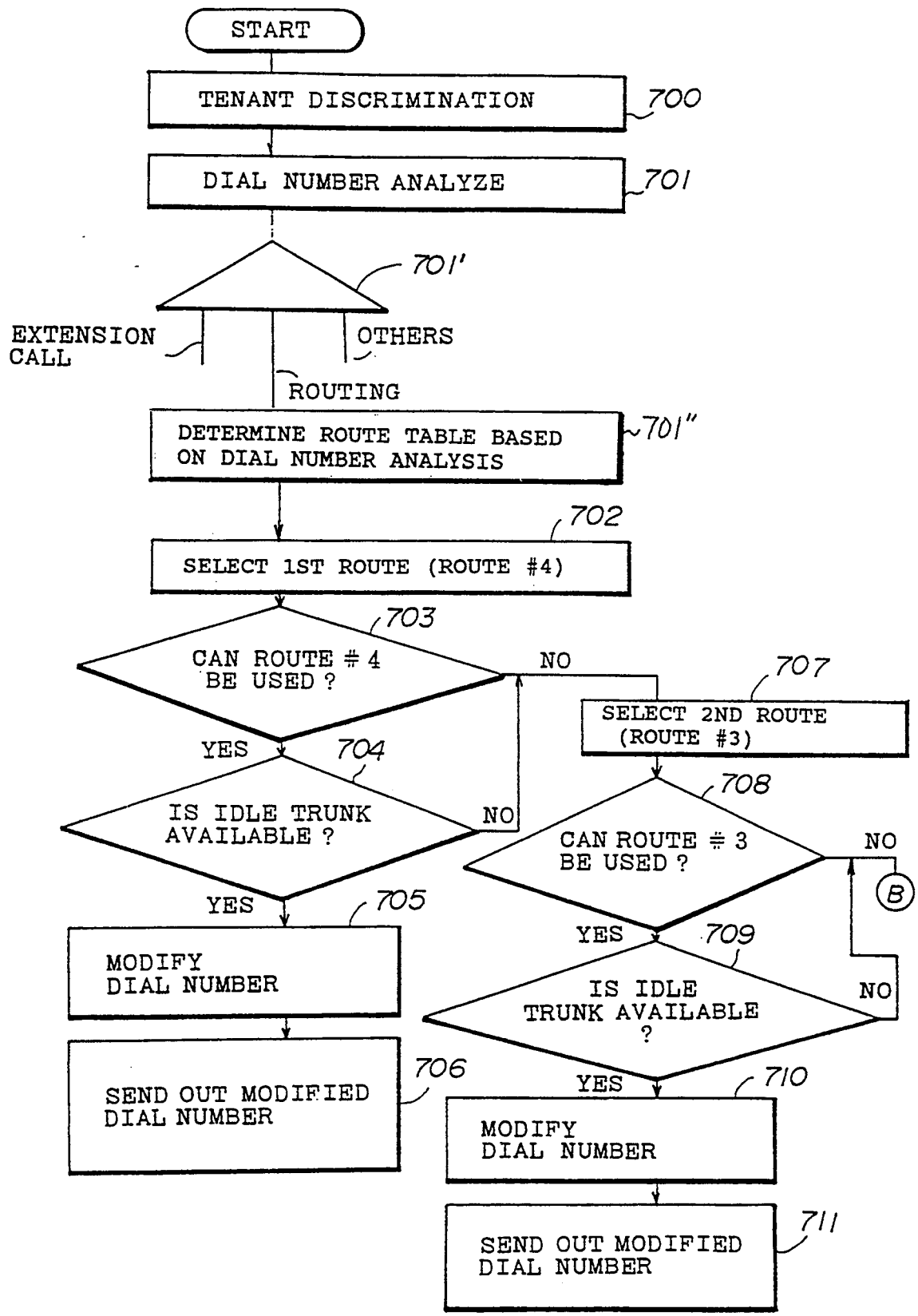
FIGS.9A and 9B are flowcharts showing the operation of the private branch exchange shown in FIG.7.
Figure 9B:
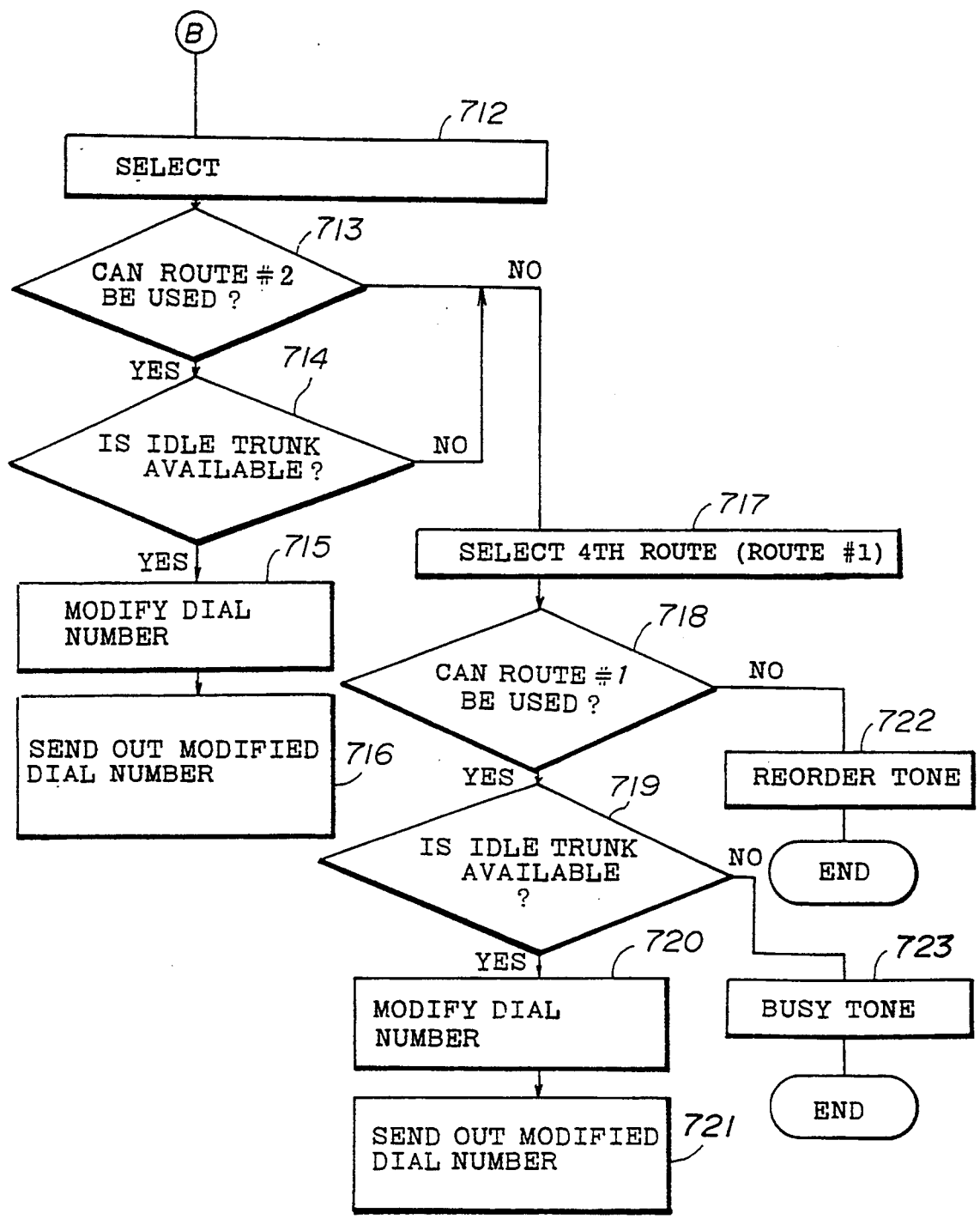

The operation of the third embodiment is shown in FIG. 13, in which step 700' is added between the steps 700 and 701 shown in FIG.9A. After executing step 700, the controller 11 executes at step 700', at which step the controller 11 operates in the above-mentioned way.

The above-mentioned third embodiment of the present invention can be applied to the aforementioned first embodiment of the present invention. Step 700' is added between step 400 and step 401 shown in FIG.6A.

The program (information) for selecting the optimal route may be employed in common for all tenants or may be provided individually for each of the tenants.

The present invention is not limited to the specifically disclosed embodiments, and variations and modifications may be made without departing from the scope of the present invention. For example, the optimal route selecting procedure may be based on a condition other than the communication cost and the communication quality. The LCR tables are not limited to the time base but can be based on another base.

What is claimed is:

1. A private branch exchange system, located in a first zone and operative for connecting calls from the first zone to a remote zone, comprising:

a plurality of tenants, each tenant having a plurality of associated terminals, each terminal being selectively operable for placing a call;

a switch associated with the plurality of tenants, each associated terminal of each tenant being connected to the switch and each call placed by a calling terminal being coupled to and received by the switch;

a plurality of trunks connected to said switch, the switch coupling a received call to a selected trunk for transmission through the trunk;

a plurality of routes which selectively receive calls transmitted through the plurality of trunks, each route coupling the call received thereby to the remote zone, each tenant establishing a priority order of selected routes, of the plurality of routes, for coupling calls from the associated terminals thereof to the remote zone;

memory means for storing, in a table, information indicating, for each tenant, the respective priority order of selected routes; and control means, coupled to said switch and said memory means and responsive to a call received by the switch, for identifying the tenant with which the calling terminal is associated and for accessing the memory in accordance with the identified tenant to obtain the information stored in the table of the memory means indicating the respective priority order of selected routes for the tenant and, in responsive thereto, for selecting an optimal route for coupling of the call to the remote zone in accordance with determining and selecting the highest priority order available route, of the respective priority order of selected routes established for the identified tenant, and controlling the transmission of the call over the selected optimal route to the remote zone.

2. A private branch exchange system as recited in claim 1, further comprising:
   at least one line trunk, independent of the plurality of trunks, and at least one communication line, independent of the plurality of routes, the at least one line trunk being connected to the switch and the at least one communication line coupling the at least one line trunk to the remote zone, the at least one line trunk and the at least one communication line, connected thereto, having a higher priority than the highest priority of the plurality of routes;
   a selected tenant, of the plurality of tenants, having the sole capability of selecting the at least one line trunk and the connected, at least one communication line as the highest priority selected route, in establishing the respective priority order of selected routes; and
   the control means further comprises means for identifying the tenant with which the calling terminal is associated and selecting the at least one line trunk and the connected, at least one communication line as the optimal route.

3. A private branch exchange system as recited in claim 1, wherein the plurality of trunks is respectively connected to the plurality of routes, each route receiving calls transmitted through the respectively corresponding trunk and coupling the calls received thereby to the remote zone.

4. A private branch exchange system as recited in claim 3, wherein:
   the control means couples each call received at the switch through the optimal route by controlling the switch so as to connect the terminal to the trunk which corresponds and is connected to the route selected as the optimal route.

5. A private branch exchange system as recited in claim 1, further comprising:
   a local route coupling calls from a first terminal to a second terminal within the first zone and independent of the plurality of routes which couple calls to the remote zone and which comprise toll routes;
   each terminal of the plurality of terminals associated with each tenant being operable for selectively placing calls to the local zone and to the remote zone in accordance with issuing corresponding local and remote dial numbers; and
   said control means further comprises means for recognizing, from the local and remote dial numbers of a call received at the switch, whether the call is to the local zone or to the remote zone and, in response to recognizing that the call is to the remote zone, generating a modified remote zone dial number corresponding to the dial number issued wit the call, the modified dial number designating the optimal route selected by the control means.

6. A private branch exchange system as recited in claim 5, further comprising:
   a toll exchange selectively interconnecting the plurality of trunks and the plurality of routes;
   the control means selecting an available trunk, of the plurality of trunks, for coupling a call received by the switch for transmission through the selected, available trunk to the tool exchange; and
   the toll exchange being responsive to the modified dial number for coupling the corresponding call, coupled to the toll exchange, through the corresponding route selected as the optimal route.

7. A private branch exchange system as recited in claim 1, wherein:
   said memory means has stored therein a first table of information identifying the plurality of routes coupling the switch to the remote zone and a second table of information indicating the selected routes and the respective, relative priorities thereof, for each of the plurality of tenants.

8. A private branch exchange system as recited in claim 1, wherein each tenant establishes the respective, relative priority order of selected routes based on the respective, relative communication costs of the plurality of routes, the highest priority route having the lowest relative communication cost.

9. A private branch exchange system as recited in claim 1, wherein each tenant establishes the respective, relative priority order of selected routes based on the respective, relative communication qualities of the plurality of routes, the highest priority route having the highest communication quality.

10. A private branch exchange system as recited in claim 1, wherein the respective priority order of selected routes of each tenant is based upon a combination of the respective, relative costs and the respective, relative communication qualities of the plurality of routes, the highest priority being based on a compromise optimum assessment of the lowest relative cost for the highest relative quality and successively lower priorities being based on successively lower said compromise optimum assessments.

11. A private branch exchange system as recite din claim 1, wherein:
   each tenant establishes, for at least first and second differing conditions, respective first and second priority orders of selected routes;
   the memory means stores, in respectively corresponding, at least first and second tables, the at least first and second priority orders of selected routes for each of the plurality of tenants; and
   the control means is responsive to the identified tenant associated with the calling terminal from which a call is received at the switch and to the existence of one of the at least first and second conditions for accessing the respectively corresponding one of the at least first and second tables of information stored in the memory means for the respective, identified tenant.

12. A private branch exchange system as recited in claim 11, wherein:
   said control means further comprises means for indicating a present time; and
   the at least first and second conditions comprise mutually exclusive, at least first and second time periods.

* * * * *

UNITED STATES PATENT AND TRADEMARK OFFICE
CERTIFICATE OF CORRECTION

PATENT NO. : 5,337,352
DATED : August 9, 1994
INVENTOR(S) : KOBAYASHI et al.

It is certified that error appears in the above-indentified patent and that said Letters Patent is hereby corrected as shown below:

Col. 1, line 36, after "(i.e., routes)" insert --,--.

Col. 2, line 43, change "π2" to --#2--.

Col. 5, line 49, after "which" insert --are-- and after "FIG. 3A" delete "are".

Col. 6, line 61, after "necessary" insert --,--.

Col. 8, line 35, delete "the" (first occurrence);
line 42, after "(R2)" insert --,--.

Signed and Sealed this

Fourteenth Day of March, 1995

Attest:

BRUCE LEHMAN

*Attesting Officer*  *Commissioner of Patents and Trademarks*